Dec. 28, 1965    A. RUST    3,225,532
BALE BUNCHER
Filed Feb. 26, 1964    2 Sheets-Sheet 1
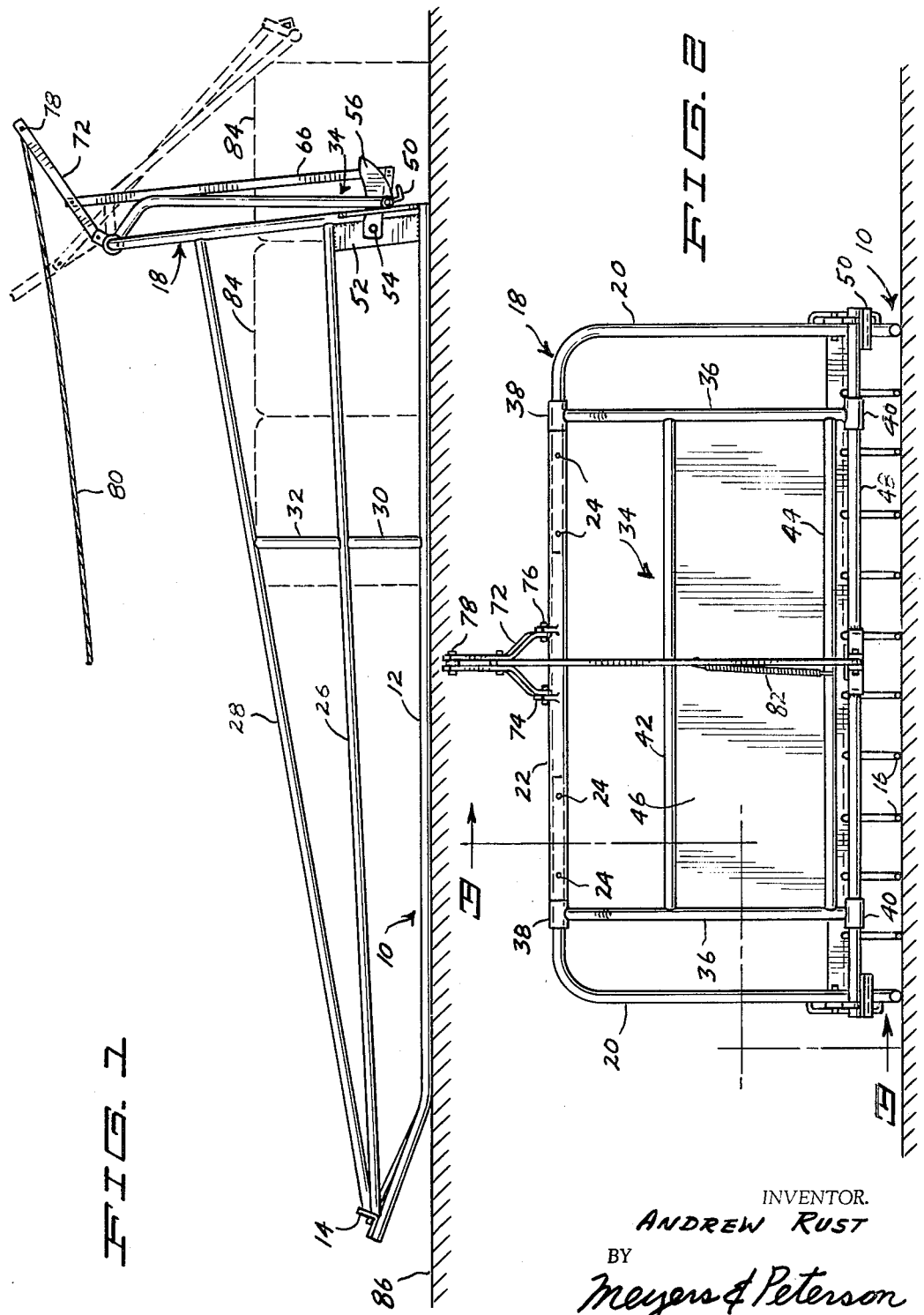
INVENTOR.
ANDREW RUST
BY
Meyers & Peterson
ATTORNEYS

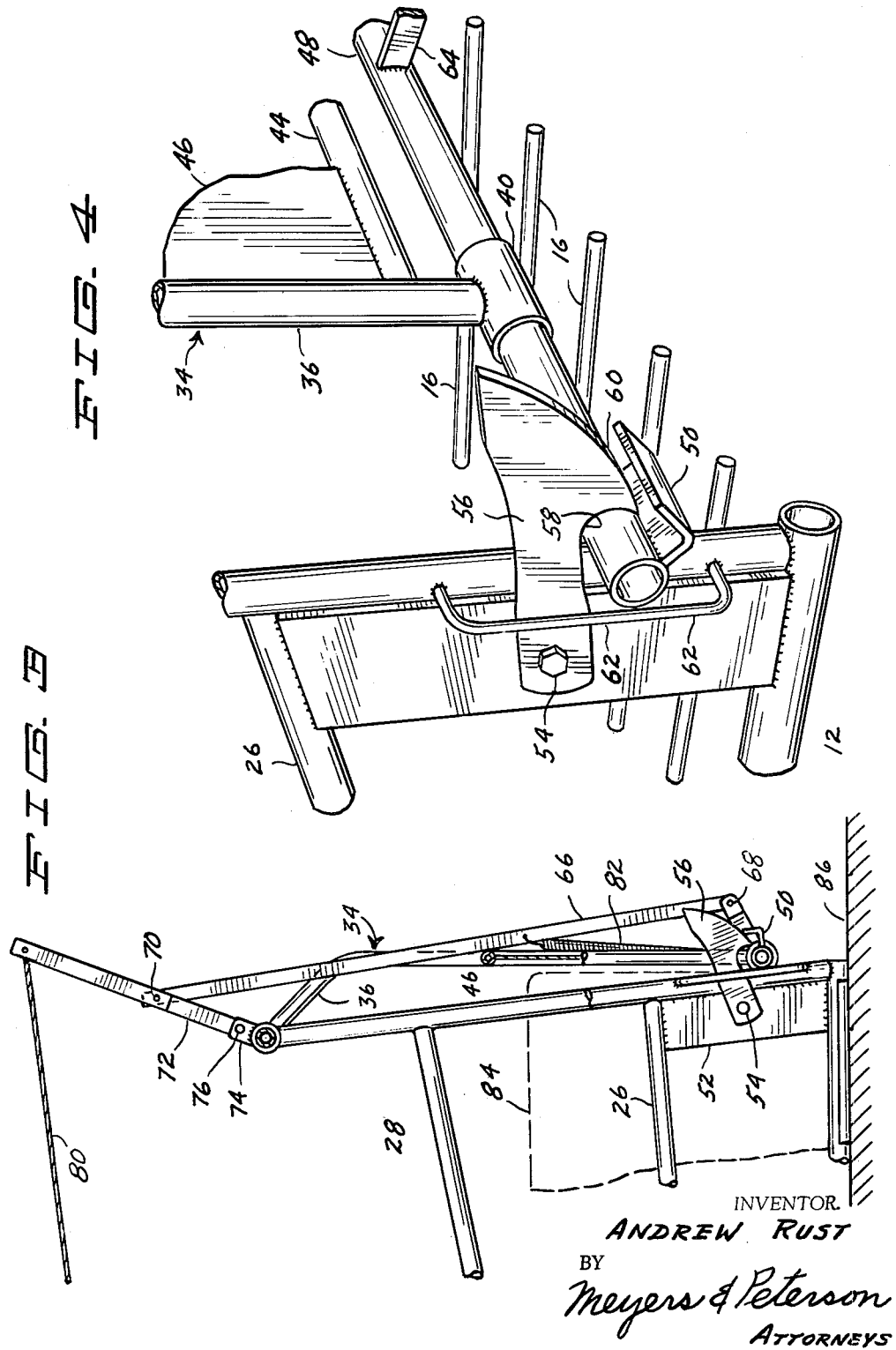

United States Patent Office 3,225,532
Patented Dec. 28, 1965

3,225,532
BALE BUNCHER
Andrew Rust, Box 62, Mercer, N. Dak.
Filed Feb. 26, 1964, Ser. No. 347,574
1 Claim. (Cl. 56—475)

This invention relates generally to bale bunchers, and pertains more particularly to a latching mechanism for releasing a gate at the rear of the buncher in order to permit the bunched bales to be discharged onto the ground.

Bale bunchers have been used for a number of years to collect bales of hay as they are ejected from the baling apparatus. As the name indicates, the buncher accepts the individual bales and retains them in place on the buncher until a predetermined number has been collected. The farmer then effects the release of a swingable gate that permits the bunched bales to be discharged onto the ground, the buncher continuing to move forwardly during the discharging period.

One object of the present invention is to permit the easy release of the swingable gate so that the bales can be discharged. In this regard, it will be appreciated that the bales as they are being bunched exert a rearward pressural action on the gate during the time it is latched closed. Hence, a problem exists with respect to releasing the gate even though at times a considerable force is being exerted thereagainst. An aim of the present invention is to minimize the actuating force needed to unlatch the gate so that the bunched bales can pass rearwardly.

Another object of the invention is to provide a latching mechanism for bale bunchers that will be rugged, simple and relatively inexpensive to manufacture, thereby encouraging its widespread use on apparatus of this type.

Another object is to provide a latching mechanism that cannot only be unlatched easily but which will automatically relatch itself when it is desired to accumulate another bunch of bales. Therefore, the invention has for a feature the automatic re-engagement of a pair of hooks when the gate is permitted to swing back to its closed position.

These and other objects and advantages of my invention will more fully appear from the following description, made in connection with the accompanying drawing, wherein like reference characters refer to the same or similar parts throughout the several views and in which:

FIGURE 1 is a side elevational view of a bale buncher equipped with my latching mechanism, the solid line position depicting the gate in its closed or latched position and the phantom line position indicating the gate after it has been unlatched and swung upwardly by the bunched bales as they pass rearwardly during the discharging procedure;

FIGURE 2 is a rear elevational view corresponding to FIGURE 1;

FIGURE 3 is an enlarged fragmentary view, partly in section, taken in the direction of line 3—3 of FIGURE 2, indicating the position of the parts as the unlatching is taking place, and FIGURE 4 is a perspective view of a portion of the latching mechanism, the view denoting one of the drop hook members in engagement with one end of a rock shaft, the rock shaft carrying a cam which effects a disengagement of the depicted hook member when the rock shaft is rotated.

Referring now in detail to the drawings, a generally horizontal base unit has been designated in its entirety by the reference numeral 10. The base unit 10 comprises a pair of side runners 12 having their forward ends inclining upwardly so that the base unit can be pulled over the ground. A transverse angle iron member 14 connects the forward ends of the runners 12 and a plurality of spaced intermediate bars or rods 16 are attached to the angle iron 14. As will be discerned from FIGURES 2 and 4, the spacing of these bars 16 will allow the bales to engage the ground as the base unit 10 is pulled forwardly. Thus, there is a constant drag on the bales which will cause them to move rearwardly on the base unit.

At the rear end of the base unit 10 is an upstanding inverted U-shaped frame unit 18. As best understood from FIGURE 2, the frame unit 18 includes a pair of L-shaped side legs 20 having vertical portions and inturned horziontal portions. The inturned horizontal portions are of sufficient length so as to be received in a transverse pipe or tube 22 and the pipe or tube 22 is prevented from turning or twisting on these inturned horizontal portions through the agency of a plurality of screws 24. Thus, it will be seen that a rigid structure is formed, and the vertical portions of the members 20 together with the horizontal pipe or tube 22 form an opening via which the bales can be discharged.

Describing the bale buncher further, it will be noted that inclined braces 26, 28 are located at each side and that these braces are reinforced by reason of connecting vertical braces 30, 32. Consequently, the entire bale buncher is rendered quite sturdy and rugged.

In order to close the opening formed by the inverted U-shaped frame unit 18, a gate indicated generally by the reference numeral 34 is utilized. This gate is composed of bowed side members 36 (FIGURES 1 and 3), each having an upper bushing or sleeve 38 and a lower bushing or sleeve 40 (FIGURE 2). The gate further includes transverse upper and lower reinforcing members 42 and 44, there being a panel 46 extending vertically therebetween and extending horziontally to each of the side members 36. The gate 34 is suspended for swinging movement by virtue of the two spaced bushings 38 at the upper end of the gate, these bushings 38 freely encircling the horizontal inturned portions belonging to the L-shaped members 20. An important feature of the invention is the provision of a rock shaft 48 which is journaled for rotation in the lower bushings 40. At each end of the rock shaft 48 is a cam element 50 in the form of an angle iron having one edge thereof welded to the rock shaft so as to extend radially from said shaft.

A pair of mounting plates 52 serve to retain the inverted U-shaped frame unit 18 in a substantially upright position. These mounting plates serve another function in that they carry pivot pins or bolts 54 for pivotally mounting a pair of drop hooks 56 having notches formed at 58. Each hook further has a sloping or inclined edge at 60 which is engageable by the free edge of the particular cam element 50 that is in registry therewith when the rock shaft 48 is rotated. These sloping edges 60 also function to permit a relatching of the hooks 56 with the rock shaft 48 as will be better understood hereinafter. A guard rod 62 is mounted at each side of the frame unit 18 and assures the freedom of pivotal movement that is necessary with respect to the drop hooks 56.

Centrally disposed on the rock shaft 48 is a bifurcated rocker arm 64. This rocker arm 64 extends radially from the rock shaft 48 and connects with a substantially vertical link 66, a lower pin 68 functioning to effect the pivotal connection. A second pin 70 at the upper end of the link 68 similarly connects the link 66 to a forked arm 72 pivotally connected to a pair of mounting ears 74 through the agency of a pair of pivot pins 76. Owing to the fact that the mounting ears 74 are integral with the pipe 22, it follows that these ears 74 are fixed with respect to the frame unit 18. In this regard, it will be recalled that the pins 24 anchor the pipe 22 to the inturned ends of the members 20. At the free end of the forked arm 72 is a pin 78 to which is attached a flexible cable 80. When the cable 80 is pulled, the latching mechanism functions to cause disengagement of the drop hooks 56 from the rock shaft 48. A return spring 82 is responsible for pulling the forked arm 72 back to the position in which it appears in FIGURE 1 after an unlatching operation.

Having presented the foregoing information, the manner in which a bale buncher equipped with my invention is used should be readily apparent. However, a brief description of what takes place will undoubtedly be of assistance in fully appreciating the benefits to be derived from a practicing of the invention. As indicated in FIGURES 1 and 3, a plurality of bales 84 are present. In the phantom position of the bales 84 of FIGURE 1, it will be seen that these bales are in the process of being discharged from the bale buncher, whereas FIGURE 3 represents the rearmost bale 84 prior to the releasing action that takes place in order to effect the discharge.

As the bale buncher shown in FIGURE 1 is pulled forwardly or to the left, it will receive a number of bales 84 from the baler (not illustrated). Consequently, instead of the baler dropping the bales individually onto the ground 86, they are deposited on the forward portion or section of the base unit 10. Due to the spacing of the bars 16, a sufficient frictional drag is imparted to the various bales 84 so that they immediately move to the rear as the bale buncher is pulled forwardly.

When a sufficient number of bales 84 have been collected on the base unit 10, the farmer will wish to discharge these bales so that they can later be conveniently picked up. To do this, the farmer pulls the cable 80 which rocks the shaft 48 in a counterclockwise direction as viewed in FIGURES 1, 3 and 4. FIGURE 3 pictures the rock shaft 48 in a partially rotated position which is causing the free end of the cam element 50 to abut against the sloping edge 60 of the particular drop hook 56 with which it is associated. Obviously, the same action is taking place simultaneously at the other side of the bale buncher, for there are two such drop hooks 56 which effect the latching of the gate 34 into a closed position via the engagement of their notches 58 with the rock shaft 48. However, the rotation of the rock shaft 48 is instrumental in lifting the hooks 56 so that the hooks are no longer in engagement with said shaft 48. The gate 34 is then free to swing upwardly and does so by reason of the pressural action being exerted thereagainst by the bales 84. It will be appreciated that this force creates a problem that has heretofore interfered with the facile release of tail gates used at the rear ends of bale bunchers. The advantage derived from the instant invention stems from the large amount of mechanical advantage that can be produced by merely rocking the shaft 48.

After the bunched bales 84 have passed rearwardly and thus discharged onto the ground 86, the gate 34 will automatically swing back to its closed position. As it swings downwardly, the rock shaft 48 carried at the lower end of the gate 34 will ride against the sloping edges 60 on the drop hooks 56, thereby forcing the drop hooks upwardly. Stated somewhat differently, as the gate 34 swings closed, the action of the rock shaft 48 simply urges the drop hooks 56 in a counterclockwise direction which effects the re-engagement of the notches 58 with said shaft 48. Thus, once the cable 80 is released, the weight of the gate 34 effects the foregoing action, the drop hooks 56 gravitationally causing the re-engagement of these hooks with the shaft 48 to relatch the gate 34 in its closed position. When another bunch of bales 84 have been collected, the farmer will again pull on the cable 80 and the same operation will be repeated.

It will, of course, be understood that various changes may be made in the form, details, arrangements and proportions of the parts without departing from the scope of my invention as set forth in the appended claims.

What is claimed is:

A bale buncher comprising:
(a) a generally horizontal base unit adapted to be pulled along the ground having a forward end portion where the bales to be bunched are deposited and a rear end portion where the bunched bales are to be discharged;
(b) a gate at the rear end of said base unit;
(c) means at the rear end portion of said base unit including an upper transverse member;
(d) means suspending said gate for swinging movement about said transverse member;
(e) a cylindrical rock shaft carried by the lower end of said gate;
(f) an arm fixedly attached to a central portion of said rock shaft and extending rearwardly therefrom;
(g) a second arm pivotally mounted to a central portion of said transverse member and extending rearwardly therefrom in substantial vertical alignment with said first arm;
(h) a link member connected at its lower end to said first arm at a point spaced from said rock shaft and connected to said second arm at a point spaced from said transverse member for rocking said rock shaft when said second arm is pivoted upwardly;
(i) a drop hook pivotally mounted at each side of said base unit formed with a downwardly facing notch of a depth greater than the radius of said cylindrical rock shaft for engaging said rock shaft to latch said gate closed to prevent bales from being discharged, and
(j) a cam member mounted adjacent each end of said rock shaft and normally projecting downwardly therefrom for effecting disengagement of said drop hooks to unlatch said gate when said shaft is rocked to raise each cam member whereby the bunched bales on said base unit are permitted to be discharged onto the ground,
(k) said drop hooks also having inclined surfaces engaged by said rock shaft as said gate swings downwardly to pivot said hooks upwardly and thereby effect re-engagement of said shaft with said notches.

References Cited by the Examiner

UNITED STATES PATENTS

| | | | |
|---|---|---|---|
| 151,466 | 6/1874 | Bourne | 292—19 |
| 307,257 | 10/1884 | Bacon | 292—19 |
| 447,442 | 3/1891 | Behrman | 298—6 |
| 2,689,055 | 9/1954 | Kizer | 56—474 |

ABRAHAM G. STONE, *Primary Examiner.*

RUSSELL R. KINSEY, T. GRAHAM CRAVER,
*Examiners.*